Sept. 12, 1950    J. W. WEST    2,522,417
ELECTRICAL DISCONNECTOR
Filed Jan. 30, 1946
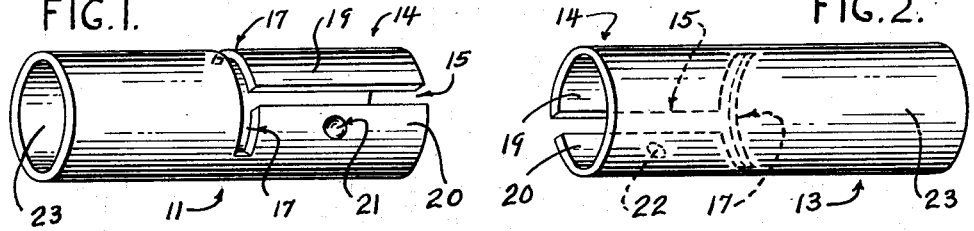
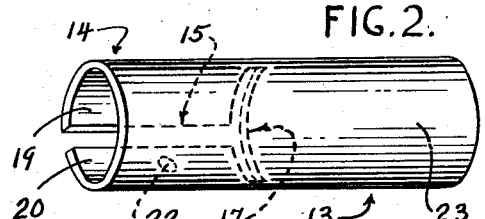
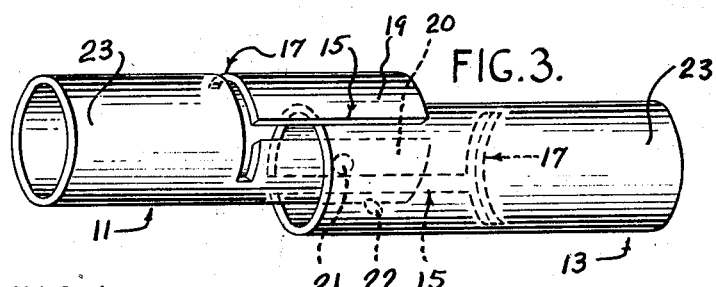
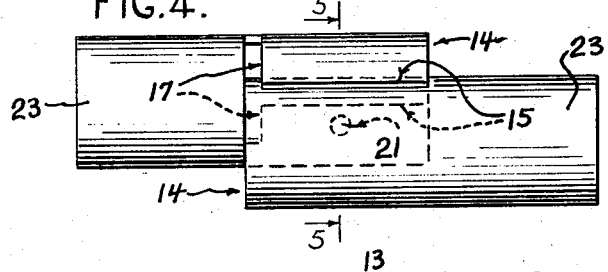
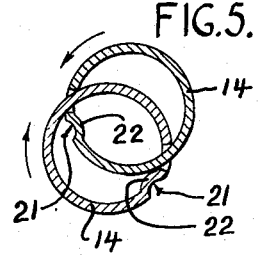
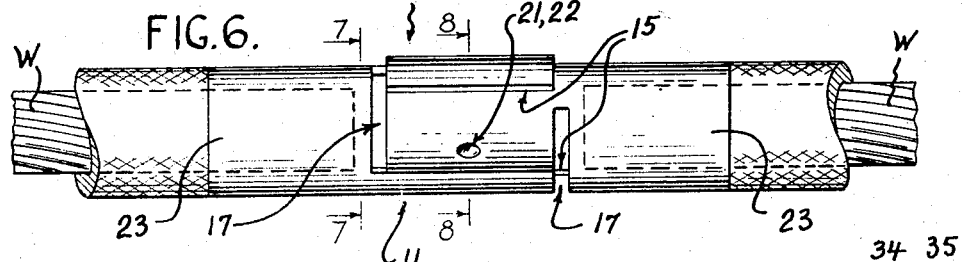
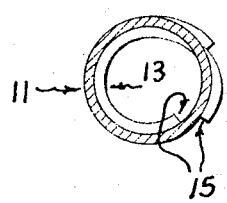
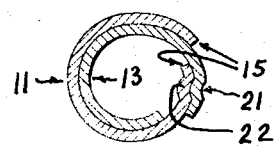
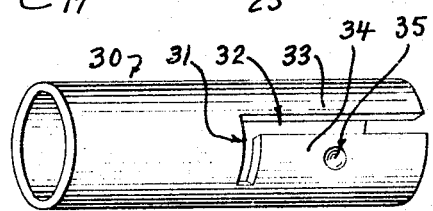
INVENTOR
JOHN W. WEST
BY
James C. Ledbetter
ATTORNEY Patented Sept. 12, 1950

2,522,417

UNITED STATES PATENT OFFICE 2,522,417

ELECTRICAL DISCONNECTOR

John W. West, Maplewood, N. J., assignor to The Thomas & Betts Co., Elizabeth, N. J., a corporation of New Jersey Application January 30, 1946, Serial No. 644,229

6 Claims. (Cl. 287—76)

This invention relates to connectors and more particularly a new and useful electrical disconnector for use more especially in electrical wiring installations.

In the manufacture of electrical connectors of the duplicate or identical terminal disconnect type, trouble is sometimes experienced in achieving adequate contact area or surface engagement between the quick connect and disconnect parts of twin or duplicate dimension and form. Thus, conventional connectors sometimes lack pressure engaging area for good electrical transmission and lack, when plugged together, adequate wiping coaction by which to brush and clean the contacting surfaces of grit, oxide and other foreign matter detrimental to effective electrical transmission.

This invention seeks to solve the problem by employing, as for example, resilient sleeve or tubular parts which may have a compound (longitudinal and rotary) wiping motion during engagement, and more particularly an effective rotary wiping action under elastic pressure when engaged or plugged together, such engaging action including said longitudinal and/or rotary motion of one or both parts in relation to each other as they are brought together to effect a good electrical connection and a secure mechanical joint in the form of a double or dual connection, as will be explained.

An object of the invention is to produce an electrical terminal, two of which constitute a connector of the quick disconnect type comprising duplicate end terminal pieces or fittings, to wit, twin parts of sleeve or tubular form, such two identical terminals being used for establishing an electrical connection either as a splice for joining two cable or wire ends, or as an end terminal on a wire plugged into a terminal block, or connected with a binding post, or with a stud connector in electrical panel work, and other examples of wiring installations.

Accordingly, one form of the terminal may be readily manufactured in quantity, and two such terminals or twins are required to make an electrical connection to suit any one of the above mentioned particular types of installations which have been mentioned as examples of utility of the fitting.

Among other things, a purpose of this invention is to produce new electrical connector terminals which are simple in their installation and embody novel features which afford positive retention of the parts in operative or connected relation and also effect a rotary pressure wiping surface contact to reduce and maintain electrical resistance at a minimum.

This description and the accompanying drawings explain the invention and indicate further purposes thereof, present it in a manner preferred at this time, and demonstrate the features thereof in order to disclose the scope and principle of the invention, thus suggesting further examples of construction which may develop out of the teachings herein or which may occur to others who wish to avail themselves of the benefits of the invention, and also aid in understanding the problems sought to be solved.

The drawings show the principle of the invention adapted to a splice connector, and it is obvious that the engaging portion of the terminal is the same for the various other types of connectors above mentioned as examples of its utility.

Figs. 1 and 2 show perspective views of sleevelike terminals disposed in coaxial alignment with their engaging ends ready to be plugged together, each terminal being identical in construction and dimensions with the other, hence twins.

Fig. 3 shows the two terminals with their engaging ends initially inserted longitudinally, one loosely embraced within the other, thus being telescoped, preliminary to completing an electrical connection and mechanical joint.

Fig. 4 shows a side elevation of the two terminals pushed further into each other and to the limit of permissible lengthwise movement. They are still in loose engagement and are ready for relative rotation to complete the dual connection, that is, an electrical connection and a mechanical joint.

Fig. 5 is a view in transverse section taken in the plane indicated by the line 5—5. The two arrows indicate the direction which one or both terminal sleeves are rotated to complete the connection shown in Fig. 6.

Accordingly, Fig. 6 is a view showing the two terminals completely plugged one into the other and rotatably embraced under pressure to complete the electrical and mechanical connections. Electrical wires or conductors, normally fixed thereto in a conventional manner, also are illustrated.

Fig. 7 is a view taken in the plane indicated by the line 7—7 showing, in cross section, the two terminals completely rotated to illustrate the pressure engaged electrical contacting position of the sleeve-like twin terminals in the finally locked position of Fig. 6.

Fig. 8 is a view taken in the plane 8—8 showing a boss and socket latching detent in engaged position establishing mechanical engagement, that is, an effective joint which holds against pull-out or inadvertent disengagement.

Fig. 9 shows a modified form of the resilient terminal sleeve employing an L-shaped longitudinal slot and a transverse slot, as distinguished from the substantially T-shaped slot shown in the first form of the invention.

Referring further to the drawings, it will be noted that a pair of coacting metallic connector sleeve terminals 11 and 13 are cylindrical and are identical in all respects. Each sleeve connector part 11 and 13 is formed, commencing with their adjacent inner ends 14 which coact, with a longitudinal slot 15 terminating at substantially the mid point of a peripherally or cross extending slot 17 so as to be in communicating connection therewith. The lengthwise slot 15 is made wider than the thickness of the sleeve wall. By means of the crosswise and lengthwise slots 17 and 15, respectively, two side wall or segmental portions in the form of wings 19 and 20 of the sleeve are rendered elastic, resiliently yieldable, and distortable.

One side wall portion 20 of the sleeve is also formed with a locking or more particularly a latching indentation or detent socket 21 pressed into the outer surface, thus providing a counterpart detent boss 22 extruded on the inner surface. In this example of the invention, the detent socket and boss 21, 22 is formed proximate the lengthwise slot 15 of one of the resilient segmental portions 19 or 20 of the sleeve.

The outer end 23 of the terminal sleeve, opposite the slotted coacting or engaging end 14, is adapted to receive a cable or wire W for electrical connection therewith and secured as by a pressure solderless joint or in any other conventional manner.

To unite or engage two terminals in connected relation, the slotted ends 14 are preliminarily telescoped as shown in Fig. 3, the flexible or yielding end portion 14 of one terminal 11 passing into the slot 15 of the other terminal 13 and vice versa, and continuing this longitudinal movement, until the edges formed by the peripherally extending or transverse slots 17 of both sleeves 11 and 13 abut the end edges of both sleeve end portions, as in Fig. 4. The two straddling terminals 11 and 13 so positioned (Fig. 4) are then rotated and ride upon and about one another (arrows in Fig. 5) to bring one resilient wing, as 19, over the same or corresponding resilient wing 19 on the other terminal to frictionally engage each other, under sustained and undiminished spring pressure, by a hugging or embracing action, each terminal through the slot 15 of the other. The spring pressure of the overlapping side wall twin portions or segments 19 and 19, as well as 20 and 20, provides a circular-area pressure contact which is wiped clean and which makes a good low-resistance electrical connection between the twin terminals 11 and 13 and their two cables or electrical conductor wires W.

By rotating the twin sleeves 11 and 13, as above explained, one on and into the other, the twin socket-bosses 21, 22 come into registration and snap together, that is, the inner convex or nose side 22 of one connector sleeve 11 drops down into the outer concave or socket side 21 of the other connector sleeve 13. This detent engagement increases the grip of each twin terminal with the other and provides a resiliently releasable mechanical joint or connection having good resistance to separation, thereby adding to the pull out value of the connector. The duplicate or twin socket-boss detent 21, 22 provides a simple and effective resilient latching means for the two terminals plug-rotated together to make a quickly operated disconnector.

To disconnect the two joined terminals, they are relatively rotated in directions opposite from that performed in locking the sleeves together, that is, opposite to the indicator arrows in Fig. 5, whereupon they readily separate by pulling them apart, as demonstrated by reading reversely from Fig. 6 in succession back to Figs. 1 and 2.

Accordingly, it is seen that each terminal 11 and 13 interfits the other, in that each terminal has a portion thereof on the inside and another portion thereof on the outside of the other. Thus each terminal is coiled under pressure into and through the lengthwise slot 15 of the other. They engage and disengage with wiping pressure contact over a maximum area for a given terminal size, and the longitudinal slot 15 of each terminal embraces the wall of the other when performing the compound motion (longitudinal and rotary) for connecting and disconnecting the terminals.

Such a characteristic construction and mode of operation provides a two-in-one or dual connection, in that the two slitted engaging plain or smooth segments 19 are spring loaded when engaged to apply undiminished spring pressure against each other without contraction or drop in pressure in order to establish electrical connection, while, independently thereof, the two indented segments 20 with their combined socket-boss latching detent 21, 22 formed in such two engaged terminals are initially spring loaded during the engaging motion but contract with a drop in pressure in order to establish mechanical connection.

It will be apparent that the terminal connector sleeves, as shown in Figs. 1 thru 8, may be modified without departing from the spirit and scope of the invention. One such modification is illustrated in Fig. 9 wherein a terminal sleeve 30 has a transverse or crosswise slot 31 communicating with a lengthwise slot 32, thus forming an L-shaped slot in the sleeve. This construction provides a rigid side 33 and a resilient wing or segment 34. A latching socket and boss detent 35 is pressed inwardly of the sleeve as, for example, in the resilient side or wing portion 34. When two of these terminals 30 are rotatably plugged together, the two indented socket-bosses 35 snap together in latched registration to increase the gripping or mechanical retention of one terminal with the other, thus making the dual connection, as heretofore explained with reference to the first form (Figs. 1 thru 8) of the invention.

The disclosure herein explains the principle of the invention and presents the best mode contemplated in applying such principle, so as to distinguish the invention from others; and there is particularly pointed out and claimed, the part, improvement or combination, which constitutes the invention or discovery, as understood by a comparison thereof with the prior art.

This invention is presented to fill the need for a useful electrical disconnector. Various modifications in construction, mode of operation, use and method, may and often do occur to others skilled in the art, especially so after acquaintance with an invention. Accordingly, this disclosure is exemplary of the principles and equivalents without being limited to the present showing of the invention.

What is claimed is:

1. A pair of connectors, each comprising a sleeve having slot means and which provides a rigid portion adapted to be joined with a wire or cable, and which also provides a resilient portion adapted to releasably engage the other connector of identical construction, thus constituting a pair of such connectors, the wall of each sleeve of which is disposed through the slot means of the other, by which a portion of each sleeve is inserted inside and also a portion thereof extends outside of the other sleeve, with the resilient portion of each sleeve under sustained pressure against the other.

2. A connector as defined in claim 1, characterized by providing therein a releasable-latching means comprising a socket depressed in the outer surface of the sleeve, such socket forming a counterpart boss extruded into the inner surface of said sleeve, and in the pair of such connectors the inner boss of one registering in the outer socket of the other.

3. An electrical terminal connector comprising a sleeve adapted to have a conductor connected therewith, and also having a longitudinal slot, which is wider than the wall thickness, extending through one end of the sleeve and toward its other end, and a transverse slot communicating with the longitudinal slot, the two slots rendering radially resilient a segmental portion of the sleeve, two of such sleeves being adapted to engage each other by inserting the wall of one into the longitudinal slot of the other, and by relative rotation bringing the two resilient segmental portions into sustained pressure engagement.

4. An electrical connector comprising a pair of duplicate-dimension terminals, each of which is in the form of a sleeve, means on the outer end of each sleeve adapted to join it with an electrical conductor, the inner end of each sleeve being provided with a longitudinal slot extending toward its outer end whereof the bottom of said slot terminates at a position spaced from said outer end, and each sleeve being provided with a transverse slot formed back from its inner end, the two slots connecting with each other thereby rendering each sleeve radially resilient adjacent said slots and leaving the remaining portion of said sleeve somewhat rigid, the longitudinal slot of each sleeve straddling the wall of the other sleeve by which said two sleeves are telescoped longitudinally one into and onto the other until the inner end of each sleeve stops at the bottom of the longitudinal slot against the edge of the transverse slot of the other sleeve, the telescoped sleeves being rotated one upon the other until the resilient portion of each sleeve has ridden into and onto the rigid portion of the other sleeve, thereby resulting in a circular-area wiping contact of sustained pressure between the two terminals.

5. An electrical terminal connector comprising a sleeve having a longitudinal slot extending through its inner end and extending toward its outer end where the bottom of said slot terminates at a position spaced from said outer end, a transverse slot communicating with the longitudinal slot at the bottom end of the latter, a portion of the transverse slot being located on each side of the longitudinal slot, thus forming a substantially T-shaped slot means, the slot means rendering radially resilient each lengthwise portion of the sleeve which is adjacent each edge of the longitudinal slot, the sleeve being provided with a socket depressed into its outer surface and within its resilient portion which forms a counterpart boss on the inner surface of said sleeve.

6. An electrical terminal connector comprising a member having a longitudinal slot extending through its inner end and toward its outer end where the bottom of said slot terminates at a position spaced from said outer end, and a transverse slot on one side of and communicating with the longitudinal slot at the bottom end of the latter, thus forming a substantially L-shaped slot means, the L-shaped slot means rendering resilient the lengthwise segmental portion of the sleeve which is defined thereby, and a detent boss formed on the inner surface of the resilient segmental portion.

JOHN W. WEST.

REFERENCES CITED

The following references are of record in the file of this patent:

FOREIGN PATENTS

| Number | Country | Date |
|--------|---------|------|
| 513,893 | Germany | Nov. 20, 1930 |